US012645560B2

(12) United States Patent
Danait et al.

(10) Patent No.: US 12,645,560 B2
(45) Date of Patent: Jun. 2, 2026

(54) FEATURE MANAGEMENT FOR SOFTWARE DEPLOYMENT

(71) Applicant: Citigroup Inc., New York, NY (US)

(72) Inventors: Adar K Danait, Irving, TX (US); Ajay Kumar Tumukuntala, Irving, TX (US); Akshatha Ramesh Shenoy, Irving, TX (US); Ashwin Perappa Prashanth, Irving, TX (US); Danielle A La Rue, Jacksonville, FL (US); Flora P Sah, Boston, MA (US); Heather Marie Robison Joshi, Irving, TX (US); Maneet Sharma, Irving, TX (US); Pavithra Araleri Visweswariah, Irving, TX (US); Radhika Shetty, Jacksonville, FL (US); Varaha Venkata Ganeswara Pitla, Irving, TX (US); Vitthal Ramling Betgar, Irving, TX (US)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 18/763,887

(22) Filed: Jul. 3, 2024

(65) Prior Publication Data

US 2026/0010457 A1 Jan. 8, 2026

(51) Int. Cl.
*G06F 11/3604* (2025.01)
*G06F 11/3668* (2025.01)

(52) U.S. Cl.
CPC ...... *G06F 11/3604* (2013.01); *G06F 11/3692* (2013.01)

(58) Field of Classification Search
CPC ............. G06F 11/3604; G06F 11/3608; G06F 11/3668; G06F 11/3692
See application file for complete search history.

(56) References Cited

U.S. PATENT DOCUMENTS

| | | | | |
|---|---|---|---|---|
| 8,191,044 B1 * | 5/2012 | Berlik | ................. | G06F 11/3672 |
| | | | | 717/124 |
| 8,572,613 B1 * | 10/2013 | Brandwine | ......... | G06F 11/3604 |
| | | | | 717/136 |
| 9,916,233 B1 * | 3/2018 | Qureshi | .............. | G06F 11/3688 |
| 11,188,313 B1 * | 11/2021 | Huffman | ............. | G06F 11/3604 |
| 11,573,786 B1 * | 2/2023 | Kiselev | .............. | G06F 11/3688 |
| 12,566,485 B2 * | 3/2026 | Bernstein | ............ | G06F 11/3668 |
| 2003/0163807 A1 * | 8/2003 | Drake | ....................... | G06F 8/61 |
| | | | | 717/174 |
| 2013/0024847 A1 * | 1/2013 | Browne | .............. | G06F 11/3604 |
| | | | | 717/131 |
| 2013/0246849 A1 * | 9/2013 | Plamondon | ......... | G06F 11/3668 |
| | | | | 714/E11.178 |

(Continued)

*Primary Examiner* — Wei Y Mui
*Assistant Examiner* — Brahim Bourzik
(74) *Attorney, Agent, or Firm* — Davis Wright Tremaine LLP

(57) ABSTRACT

A set of software criteria including a condition that a software test be successfully performed prior to deploying a software package to a user device and location information indicating a storage location for status information of the software test is obtained. A testing status of the software package is analyzed using the status information at the storage location and software package is deployed to the user device as a result of the testing status confirming that the condition has been met in response to a request to deploy the software package to the user device.

20 Claims, 11 Drawing Sheets

400

| FEATURE FLAG | CHANNEL | PLATFORM | TESTING STATUS | PRODUCTION STATUS | CONFIDENCE LEVEL |
|---|---|---|---|---|---|
| BANKING SERVICES | MOBILE | IOS | ENABLED | ENABLED | HIGH |
| LOCKCARD | ONLINE | BROWSER | ENABLED | ENABLED | HIGH |
| PAPERLESS | MOBILE | ANDROID | ENABLED | ENABLED | HIGH |
| TRAVEL NOTICE | MOBILE | IOS | ENABLED | ENABLED | HIGH |

(56)              References Cited

U.S. PATENT DOCUMENTS

| | | | | |
|---|---|---|---|---|
| 2016/0063282 A1* | 3/2016 | Shani | ........................ | G06F 8/71 |
| | | | | 717/121 |
| 2018/0129812 A1* | 5/2018 | Kang | .................. | G06F 11/3636 |
| 2021/0049003 A1* | 2/2021 | Trahan | ...................... | G06F 8/73 |
| 2022/0398333 A1* | 12/2022 | Segler | ................. | G06F 11/3604 |

* cited by examiner

200

Reconciliation System
210

Requirement Management System
220

Production Storage
230

Testing Storage
240

300

| CONFIGURABLE CODE | ○ None <br> ● Yes <br> ○ No |
|---|---|
| CONFIGURABLE CODE FLAG NAME | ff_sendMoney |
| CONFIGURABLE CODE STATUS | Enabled ▼ |
| CONFIGURABLE CODE COMMENTS | allCcsIdProportion = 10% <br> bankCcsIdProportion = 40% <br> cardCcsIdProportion = 50% <br> whiteListedCCids:123456.23456 <br> customer:Segment = consumer |
| BUSINESS FUNCTION NAME | Zelle Pay |
| LOCATION OF CONFIGURABLE CODE FILE | NA |
| LOCATION OF FLAG | Entitlement Service ▼ |
| CONFIGURABLE CODE DEPLOYMENT PLATFORM | Android ▼ |
| COMMENTS | |

FIG. 3

| FEATURE FLAG | CHANNEL | PLATFORM | TESTING STATUS | PRODUCTION STATUS | CONFIDENCE LEVEL |
|---|---|---|---|---|---|
| BANKING SERVICES | MOBILE | IOS | ENABLED | ENABLED | HIGH |
| LOCKCARD | ONLINE | BROWSER | ENABLED | ENABLED | HIGH |
| PAPERLESS | MOBILE | ANDROID | ENABLED | ENABLED | HIGH |
| TRAVEL NOTICE | MOBILE | IOS | ENABLED | ENABLED | HIGH |

| FEATURE FLAG | CHANNEL | PLATFORM | TESTING STATUS | PRODUCTION STATUS | CONFIDENCE LEVEL |
|---|---|---|---|---|---|
| BANKING SERVICES | MOBILE | IOS | DISABLED | ENABLED | MEDIUM |
| LOCKCARD | ONLINE | BROWSER | ENABLED | DISABLED | LOW |
| PAPERLESS | MOBILE | ANDROID | N/A | ENABLED | LOW |
| TRAVEL NOTICE | MOBILE | IOS | DISABLED | N/A | LOW |

1000
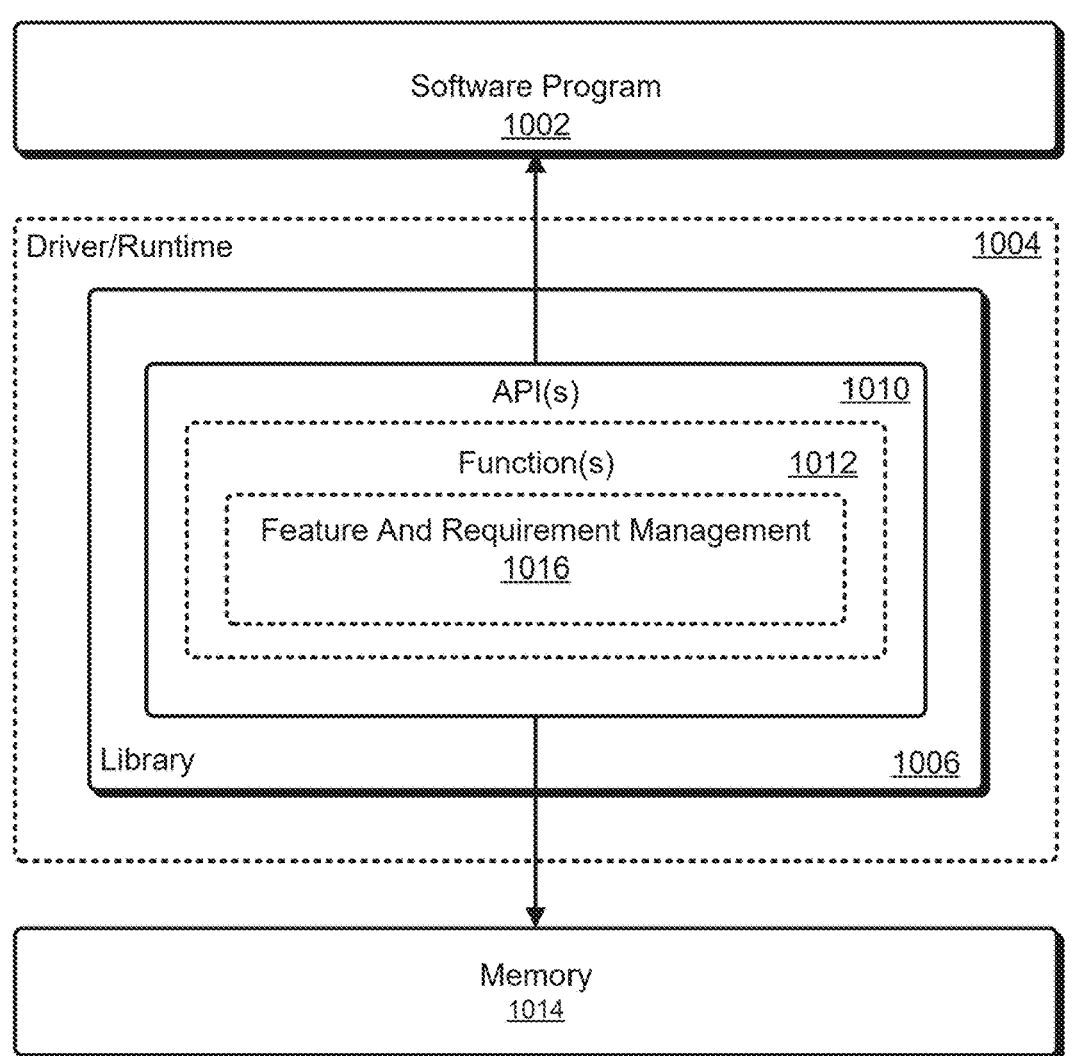
FIG. 10

FEATURE MANAGEMENT FOR SOFTWARE DEPLOYMENT

BACKGROUND

In software deployment, it is important that features not be deployed until they are sufficiently tested and that features meant to be deployed to specific users or specific platforms are deployed only to those users or platforms. Currently, managing software deployments often requires manual involvement, without adequate safeguards to prevent new software features from being deployed or activated prematurely. Unexpected activation of a feature in a customer-facing application can negatively affect user experience, and rectifying a premature deployment in a live environment can strain resources and delay other scheduled work.

BRIEF DESCRIPTION OF THE DRAWINGS

Various techniques will be described with reference to the drawings, in which:

FIG. 3 illustrates an example requirement management interface in accordance with at least one embodiment;

FIG. 10 illustrates an example application programming interface that manages features and requirements, in accordance with at least one embodiment.

DETAILED DESCRIPTION

Figure 1:
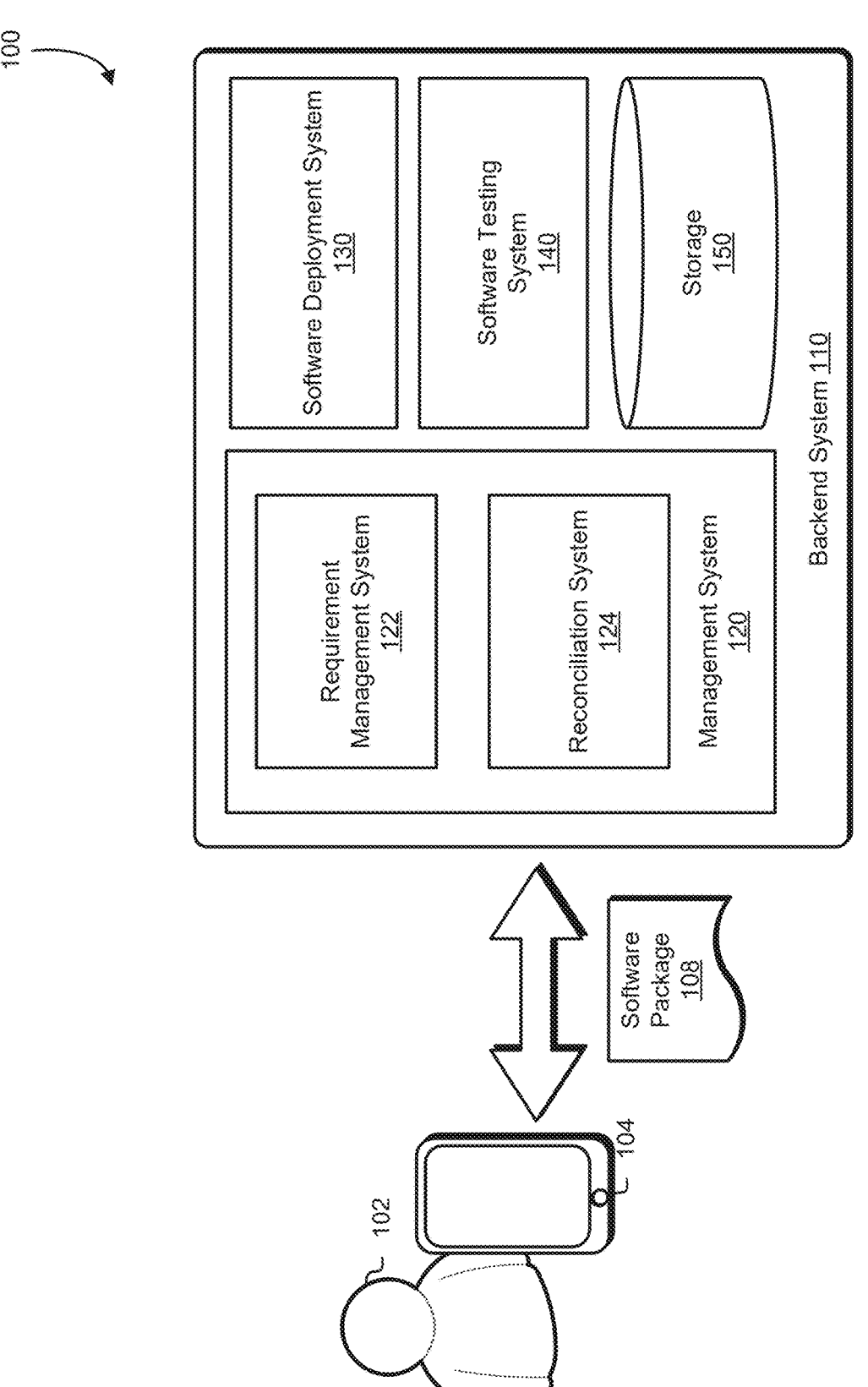
FIG. 1 illustrates an example of a system to manage features for software deployment in accordance with at least one embodiment.

Techniques and systems described below relate to management of software features during the whole software development life cycle. Systems of the present disclosure can obtain requests to define requirements (e.g., feature flags, configurable codes) for features that are within software packages. There can be hundreds or thousands of software features within the software package that is deployed to production. Systems of the present disclosure can utilize bug-tracking, issue-tracking, and/or project management platforms (e.g., Atlassian Jira, Apache Allura, Smartsheet, etc.) to define and mange such requirements.

After being deployed to production or during testing, the requirements can be used to toggle on and off the features. The system may present an interface asking whether a feature includes requirements and allows relevant entities (e.g., development team) to enter details of the requirements. In one example, the system may determine whether a feature is enabled or disabled. In another example, details may include which operating system platform to which the feature is to be deployed (e.g., Apple iOS, Google Android, Microsoft Windows, etc.). The details may further include test scripts or test cases used for testing of the features. Requirements can be imposed by controllers during production to ensure that features are presented to the intended population. For example, certain features can be targeted exclusively to users who meet predetermined criteria. Additionally, some features may be deployed but not yet available to users due to various reasons, such as regulatory issues. These requirements for features are distributed across different parts of the system to prevent unwanted release to unintended users.

In some examples, different parts of the system may identify and analyze status indicators related to the requirements defined using the system. The portion responsible for the deployment and production of features may periodically or aperiodically update status indicators in a repository specific to that portion. Similarly, the portion responsible for testing the features may also update status indicators in its own dedicated repository. The status indicators may include Boolean values or status codes. The portion that manages the requirements may receive updates to the requirements and/or features based on business decisions or perspectives. Each portion can maintain its own separate repository for these updates.

In various examples, the systems may obtain status indicators from various repositories, either periodically (e.g., every 24 hours) or aperiodically. The systems can identify and analyze issues, such as mismatches between status indicators received from different repositories. For example, if some of the features are released and visible to users but not yet tested, there is a mismatch between status indicators (e.g., enabled vs. disabled) from production and testing. Additional issues may include discrepancies between current and previous status indicators. Furthermore, the systems may detect that features, which are currently disabled, have been deployed to production for a certain amount of time without any further action being taken by the relevant entities.

The systems may generate or update dashboards that include various status indicators for each software feature. A version of the dashboard may include all the status indicators received from a single batch. In one example, if there is a mismatch between status indicators, the dashboard displays the mismatch in red and displays the match in green. In addition, the systems may send notifications and alerts to different entities that are involved in the software development life cycle. The notifications may include e-mails. In response, the systems may receive indications that the issues (e.g., mismatch of status indicators, disabled features deployed to production) are resolved as a result of performing one or more operations (e.g, updates, additional testing) to the software features. The relevant entities may update the dashboard by selecting a reason for the update and entering an identifier that is associated with the status indicator. Additionally, the systems may generate or update an audit page that provides complete historical data for software features including, for example, deployed date, source system, and whitelisting information. The systems may provide a panoramic view of flags, warnings, and stringent controls for each feature.

Techniques and systems described and suggested herein can improve the field of computing, especially the field of software feature and requirement management, by incorporating a sophisticated access control mechanism and dynamic feature flagging system. This ensures that software features remain hidden from the general user base until they are fully vetted and ready for public release. Also, this further ensures that software features can be selectively released to specific user groups. As a result, this maintains the privacy of developmental stages and prevents premature exposure. Additionally, techniques described and suggested herein improve the efficiency of computing systems by configuring a system that allows management of the entire lifecycle of features, from development to deployment. Moreover, techniques described and suggested herein are necessarily rooted in computer technology in order to overcome problems specifically arising with inadvertent access to incomplete, untested, or unstable features, which may lead to widespread system crashes, data inconsistencies, and security breaches by providing a system that can manage requirements and status indicators that are stored across different storage locations that correspond to production and testing.

Such techniques may include, for example, obtaining a set of software release criteria including a condition that a software test be successfully performed prior to deploying a software package to a user device and location information indicating a storage location for status information of the software test; and in response to a request to deploy the software package to the user device, determining a testing status of the software package from the status information at the storage location and deploying the software package to the user device as a result of the testing status confirming that the condition has been met.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

Any system or apparatus feature as described herein can include computer programs and computer program products comprising software code adapted, when executed on a data processing apparatus, to perform any of the methods and/or for embodying any of the apparatus and system features described herein, including any or all of the component steps of any method. Any system or apparatus feature as described herein can also include a computer or computing system (including networked or distributed systems) having an operating system that supports a computer program for carrying out any of the methods described herein and/or for embodying any of the apparatus or system features described herein. Any system or apparatus feature as described herein can also include a computer readable media having stored thereon any one or more of the computer programs aforesaid. Any system or apparatus feature as described herein can include a signal carrying any one or more of the computer programs aforesaid.

FIG. 1 illustrates an aspect of environment 100 for backend system 110 in which at least one embodiment may be practiced. Environment 100 may include user 102, user device 104, software package 108, and backend system 110. In some examples, backend system 110 may include software implemented at one or more computing systems, which comprises computing device 1100 illustrated in FIG. 11. Alternatively, backend system 110 may refer to any combination of software logic, hardware logic, and circuitry described herein for software management.

In various examples, terms such as "software" described herein may include one or more of operating systems, device drivers, application software, database software, graphics software, web browsers, development software (e.g., integrated development environments, code editors, compilers, interpreters), network software, simulation software, real-time operating systems (RTOS), artificial intelligence software, robotics software, firmware (e.g., BIOS/UEFI, router, smartphone, consumer electronics, embedded systems, printer, solid state drive (SSD)), application programming interfaces (APIs), containerized software, container orchestration platform, algorithms, instructions, and any other implementation embodied as a software package, code and/or instruction set.

Terms such as "hardware" described herein may include one or more of central processing units (CPU), integrated circuit (IC), system on-chip (SoC), graphics processing unit (GPU), data processing unit (DPU), digital signal processor (DSP), tensor processing unit (TPU), accelerated processing unit (APU), application-specific integrated circuits (ASIC), intelligent processing unit (IPU), neural processing unit (NPU), smart network interface controller (SmartNIC), vision processing unit (VPU), field-programmable gate array (FPGA) hardwired circuitry, programmable circuitry, state machine circuitry, fixed function circuitry, execution unit circuitry, and/or firmware that stores instructions executed by programmable circuitry.

In at least one embodiment, backend system 110 may include a distributed system configured to efficiently handle large-scale data processing and service delivery. The distributed system may spread tasks across multiple interconnected servers to ensure that no single point of failure can disrupt the system's overall functionality. Each server, or node, in the distributed system can be responsible for a specific portion of the backend operations, such as data storage, processing, or handling client requests. By leveraging this setup, backend system 110 may handle increased demand by simply adding more nodes. Furthermore, the distributed system may improve fault tolerance and reliability by redistributing its tasks to other operational nodes in response to failure of at least one node. The distributed system may facilitate communication and coordination among nodes through one or more of algorithms and protocols to ensure data consistency and synchronization across backend system 110.

In some examples, backend system 110 may provide various functions during the software development life cycle for software package 108, supporting the operation and performance of an application. Backend system 110 may handle tasks such as, for example, database management, executing server-side logic, and integrating with external services or systems associated with one or more entities involved within the software development life cycle for software package 108. Throughout the software development life cycle, backend system 110 may support data storage and retrieval, user authentication, and processing of business logic. It also facilitates communication between different application components via APIs.

In at least one embodiment, backend system 110 may oversee the entire lifecycle of software features, from initial planning and development to testing, deployment, and maintenance. Backend system 110 may provide components (e.g., management system 120, software deployment system 130, software testing system 140, storage 150) for project management, version control, and collaboration to allow the one or more entities (e.g., development team, design team, solution team, legal team, business team) to monitor the progress and status of each feature. Backend system 110 may provide detailed tracking of feature requests, bug reports, and enhancement suggestions. By providing real-time updates and comprehensive reports (e.g., dashboard 400 illustrated in FIG. 4 dashboard 500 illustrated in FIG. 5), backend system 110 may provide information associated with the current state of one or more features of software package 108 for informed decision-making and confirmation that all the features met requirements (e.g., technical, business, regulatory, legal) before release.

In at least one embodiment, software package 108 may refer to a bundle of software features that are distributed and installed together to provide a complete set of features and functionalities to the end user (e.g., user 102). Software features may include a set of microservices that have distinct requirements. Different software development systems (not explicitly illustrated in FIG. 1) can generate different features as software codes and instructions, and send it to backend system 110 for management and deployment. Software package 108 may include applications, libraries, configuration files, and user documentation. Software package 108 can include additional tools and utilities that enhance the user experience, such as graphical interfaces, support for various file formats, and connectivity options.

In some examples, software package 108 may include one or more features. The number of features within software package 108 can be hundreds or thousands. In various examples, the one or more features may include one or more user stories, where the one or more user stories can be linked to one or more requirements or software release criteria described herein.

The one or more user stories may include, for example, account registration, account login, account management, fund transfers, bill payments, alerts, notifications, loan applications, card management, security features, investment service, budgeting tools, face identification, remote deposit, check balance, custom branded cards, limited credit card opportunities, promotional offers, financial reports, financial education, tax preparation, debt management, bill management, income management, or any other tasks that are associated with an application implemented on user device 104.

In at least one embodiment, management system 120 may refer to any combination of software logic, hardware logic, and circuitry for feature and requirement management. Management system 120 may include requirement system 122 and reconciliation system 124. Management system 120 may gather, document, and validate software requirements. Management system 120 may capture detailed requirements and status indicators for each feature of software packages (e.g., software package 108) through interactive forms and questionnaires. Management system 120 may provide an interface where all entities can review, comment, and approve requirements. Management system 120 may track requirements during the whole software development life cycle. Management system 120 may keep, via one or more locations of storage 150, a history of requirement changes.

Management system 120 may perform checks to ensure that procedures are followed before releasing code. Management system 120 may execute a set of technical filters that prevent the one or more features of software package 108 from being deployed into production for user 102 until each checklist item is completed. Management system 120 may use at least requirement management system 122 and reconciliation system 124 to manage features by imposing requirements on the features. Management system 120 may also use at least requirement management system 122 and reconciliation system 124 to control how the features are deployed based on performance of a checklist (e.g., dashboard 400 illustrated in FIG. 4, dashboard 500 illustrated in FIG. 5).

In at least one embodiment, requirement management system 122 may refer to any combination of software logic, hardware logic, and circuitry for requirement management. In some examples, requirement management system 122 may include requirement management system 220. Requirement management system 220 can define or modify requirements (e.g., configurable codes, feature flags, or any other toggles or switches) for each software feature based on input or request from various entities that are involved with software development life cycle. Requirements for features may refer to values that can be used to control specific functionalities on and off without deploying new code. By wrapping features in conditional statements controlled by configuration settings, the requirements may allow entities or systems to deploy software features to production in a dormant state, activating the features only when necessary. The requirements and/or their associated status indicators can be indicated via Boolean flags (e.g., true for enable, false for disable), multivariate flags, dynamic flags, or any other metadata.

In various examples, requirement management system 120 may include a web form that stores values (e.g. requirements, status indicators) in storage 150. Requirement management system 120 may include an excel sheet with all requirements that are defined for one or more features of software package 108, where the excel sheet can be stored in storage 150. Requirement management system 120 may include project management and issue tracking tools like (but not limited to) Jira. Requirement management system 120 may determine what kind of metadata should be provided when requirements for features are defined.

In at least one embodiment, reconciliation system 124 may refer to any combination of software logic, hardware logic, and circuitry for reconciliation of features and their requirements for deployment. In some examples, reconciliation system 124 may include reconciliation system 210. Reconciliation system 124 may perform periodic or aperiodic monitoring of one or more status indicators associated with one or more requirements defined or updated using requirement management system 122. Specifically, reconciliation system 124 may receive a batch of status indicators from different locations of storage 150, where the different locations correspond to production (e.g., software deployment system 130), testing (e.g., software testing system 140), and business (e.g., requirement management system 122). Reconciliation system 124 may perform monitoring to analyze whether there is a mismatch between status indicators received from different locations of storage. If there is a mismatch, reconciliation system 124 may perform mitigation of risk. Reconciliation system 124 may perform monitoring to determine whether disabled features are being deployed for a period of time (e.g., six months).

In some examples, performing mitigation of risk may include performing one or more actions to eliminate any defects that arise out of those mismatches. Reconciliation system 124 may include notifying relevant entities (e.g., product owner, governance team) based on type of features and stage in the software development life cycle. Reconciliation system 124 may notify (1) mismatch in status indicators between testing, production, and requirements of features (e.g., user stories) defined or updated by requirement management system 122; (2) mismatch in status indicators between ones that are received in the most recent batch and the previous ones indicated by the dashboards (e.g., dashboard 400 illustrated in FIG. 4, dashboard 500 illustrated in FIG. 5); and (3) disabled features that are deployed to production for a certain amount of time. Reconciliation system 124 may perform mitigation of risk with quality assurance team/system/engine.

Reconciliation system 124 may receive indications from one or more entities that the issues have been resolved. The one or more entities may perform one or more actions (using requirement management system 122, software deployment system 130, software testing system 140 or any other systems that are part of the software development life cycle) to the features at issue to resolve the issues. Reconciliation system 124 may receive indications that the one or more actions are performed to the one or more issues of software package 108 and as a result, the issues are resolved.

Reconciliation system 124 may generate audit page that provides complete historical auditable data for the features with requirements including deployed date, source system, and whitelisting information. The audit page may track information throughout the whole software development life cycle of the features with requirements by querying one or more locations of storage 150. The audit page may include information that describes, for example, "how did the requirements met," "which entity defined the requirements," "how testing was made," etc. As a result of performing such operations, reconciliation system 124 may prevent unwanted features with requirements from getting deployed.

In at least one embodiment, software deployment system 130 may refer to any combination of software logic, hardware logic, and circuitry for software release and deployment. Software deployment system 130 may perform the process of releasing software based on verification received by one or more components (e.g., reconciliation system 124) of management system 120. Software deployment system 130 may generate release notes. Software deployment system 130 may compile the software and may create installation packages. Software deployment system 130 may store the final release (e.g., software package 108) in a storage location within storage 150, ready for deployment.

Software deployment system 130 may execute the installation and configuration on target environments such as user device 104 to deploy software package 108. Software deployment system 130 may utilize deployment scripts to transfer the packaged software from one or more locations of storage 150 to production servers. Software deployment system 130 can adjust configuration settings to match the specific requirements of the production environment. Software deployment system 130 can perform integration tests to confirm compatibility with existing systems, and smoke tests to verify successful deployment. Furthermore, software deployment system 130 can activate monitoring tools in addition to reconciliation system 124 to track the software's performance and user interactions in real-time, allowing for immediate detection and resolution of any issues that arise.

Software deployment system 130 may deploy software packages tailored to specific mobile platforms, such as iOS, Android, or online services. Software deployment system 130 may identify the target platform and execute the corresponding deployment process to ensure that the software is compatible and optimized for the platform's unique requirements. For iOS, software deployment system 130 can execute the packaging and submission of the application to the Apple App Store, adhering to all necessary guidelines and protocols. For Android, software deployment system 130 may perform the packaging and distribution through the Google Play Store, ensuring compliance with platform-specific standards. Additionally, software deployment system 130 can deploy software updates to online services by configuring them to work seamlessly across various web environments. Software deployment system 130 may update statuses of one or more features after deploying software package 108. In one example, the statuses may indicate that the one or more features are only visible to predetermined set of users, as noted in the requirements of the one or more features.

In at least one embodiment, software testing system 140 may refer to any combination of a software logic, hardware logic, and circuitry for software testing. Software testing system 140 can perform a variety of tests throughout the software development lifecycle to maintain code quality and functionality. Software testing system 140 may start with unit testing, where individual components (e.g., features) of the software are tested in isolation to verify that each part works as intended. Software testing system 140 can execute automated test scripts to validate the correctness of the code after each build and provide immediate feedback to developers. Integration testing may follow, where software testing system 140 may test the interactions between different features to ensure that they work together seamlessly. Additionally, software testing system 140 can conduct performance testing to evaluate the software's responsiveness and stability under different conditions.

Software testing system 140 can perform system testing to validate the complete and integrated software product. Software testing system 140 may execute various functional tests to verify that the software meets all specified requirements and behaves as expected in real-world scenarios. Software testing system 140 can perform tests (e.g., user acceptance testing) to validate the software's functionality, usability, and reliability from the end-user's perspective. User acceptance testing can be done before one or more features of software package 108 are released for production. Software testing system 140 can perform tests that mimic real-world usage conditions to confirm that the software meets all specified requirements specified by recruitment management system 122. Software testing system 140 can collect detailed feedback and track issues reported by users to reconciliation system 124.

Software testing system 140 may manage and organize test cases to provide comprehensive coverage of all features and functionalities. Software testing system 140 can document the results of each test case to highlight any discrepancies between the expected and actual outcome. Software testing system 140 may perform testing based on requirements and status indicators that are associated with those requirements from management system 120. Software testing system 140 may receive detailed test modalities from one or more components of management system 120. Software testing system 140 may perform testing of one or more features of software package 108.

For example, one requirement received from management system 120 may include providing software features to only certain users with premium account holders. Software testing system 140 may select users with various account types, including standard and premium to interact with an application. Software testing system 140 may execute test cases where premium users can log in and attempt to access features or user stories (e.g., higher transaction limits, personalized financial advice, and exclusive investment opportunities). Simultaneously, software testing system 140 can determine that standard users are appropriately restricted from these premium services. Software testing system 140 may collect detailed logs and user feedback to confirm that the feature's access control mechanisms are working correctly to determine that only eligible users experience the premium features as intended. Consequently, software testing system 140 can modify status indicators associated with the requirements to indicate the result and update those to reconciliation system 124, one or more locations of storage 150, or any other system that is part of the software development life cycle.

In at least one embodiment, storage 150 may refer to any method or device used to retain information for future use, encompassing a wide range of technologies designed for various durations and purposes. In some examples, one or more operations can be performed to storage 150 to ensure data availability, integrity, and security, supporting the needs of different applications and contexts.

Storage 150 may include one or more of random access memory (RAM), read-only memory (ROM), flash memory (e.g., Universal Serial Bus (USB) flash drives, SSD, memory cards), cache memory, hard disk drives (HDDs), virtual memory, graphics memory, optical discs, network attached storage (NAS), cloud storage, tape storage, etc. Additionally, storage 150 may further include one or more of relational databases, NoSqL databases, Key-Value stores, Document-oriented databases, column-family stores, and graph databases. In addition, storage 150 may also include one or more of code repositories, artifact repositories, content repositories, document repositories, package repositories, etc. And also, storage 150 may include one or more of file storage (e.g., network attached storage (NAS), cloud storage service), block storage, object storage, cache storage, tape storage, etc.

In at least one embodiment, different portions of storage 150 can be assigned specifically for management system 120, requirement management system 122, reconciliation system 124, software deployment system 130, or software testing system 140. In one example, storage 150 may include a plurality of storage devices, where each of them can be assigned specifically for management system 120, requirement management system 122, reconciliation system 124, software deployment system 130, or software testing system 140. In some examples, storage 150 may include production storage 230 and/or testing storage 240 illustrated in FIG. 1.

Storage 150 may store one or more features of software package 108. Storage 150 may store software containers that include the one or more features. In some examples, there can be different software containers for different operating systems (e.g., iOS, Android). Storage 150 may include a location to store one or more dashboards (e.g., dashboard 400 illustrated in FIG. 4, dashboard 500 illustrated in FIG. 5). Storage 150 may store audit page that provides complete historical auditable data for features with status indicators and requirements, where the historical auditable data may include deployed date, source system, and whitelisting information.

In at least one embodiment, backend system 110 may provide, by using systems not explicitly illustrated in FIG. 1, additional features for entities such as development teams to engage in other stages of software development life cycle (e.g., planning, design, implementation). For planning, backend system 110 may provide tools for identifying, analyzing, and mitigating project risks. Also, backend system 110 may perform resource management to allocate human resources, equipment, and tools. Backend system 110 may provide financial planning tools to manage project costs and budgets. For design, backend system 110 may provide tools for creating prototypes and mockups of the software to visualize design concepts; predefined templates and patterns; and integrated tools for creating and managing design documentation.

In at least one embodiment, user device 104 can be a handheld computing apparatus that is usable by user 102 to perform a variety of tasks, including making calls, sending messages, accessing the internet, capturing photos and videos, and running a wide range of applications, where the applications can be provided by one or more components of backend system 110 (e.g., software deployment system 130). User device 104 may include a touch-sensitive, high-definition display (e.g., an organic light-emitting diode (OLED) panel), capable of rendering millions of colors with a resolution exceeding 1080 p. User device 104 may include a system-on-chip (SoC) that integrates one or more central processing units (CPU), one or more graphics processing units (GPU), and one or more neural processing units (NPU) to run various features provided by software package 108. In various examples, there can be more than one user with multiple computing devices (which aren't explicitly illustrated in FIG. 1) that are part of environment 100.

In at least one embodiment, user device 104 can support various operating systems to meet diverse user requirements. User device 104 may run an extensive range of software applications by supporting a broad spectrum of operating systems (e.g., Windows, macOS, Linux, Android, iOS). User 102 can switch between operating systems according to their needs to use features each operating system provides. In some examples, user device 104 can run one or more applications to provide user 102 access to software features provided by financial institutions such as banks. User 102 can use dedicated banking apps, financial management tools, investment platforms, and payment services, all installed within user device 104. By supporting a multitude of applications, user device 104 ensures that user 102 can efficiently manage their finances, conduct secure transactions, track expenses, and monitor investments. Each application can include unique features, such as real-time account updates, budget planning, personalized financial advice, and secure messaging with financial advisors, where the features can be provided as software package 108 by at least a portion (e.g., software deployment system 130) of backend system 110.

In at least one embodiment, user device 104 can run various internet browsers to provide access to web-based or online services (e.g., online banking) offered by at least a portion (e.g., software deployment system) of backend system 110 via software package 108. User 102 can choose their preferred browser to access online banking services to manage their accounts, perform transactions, and utilize financial tools. By supporting multiple browsers, user device 104 can be compatible with the various web platforms and security protocols that includes unique features and security enhancements provided by each browser.

Figure 2:
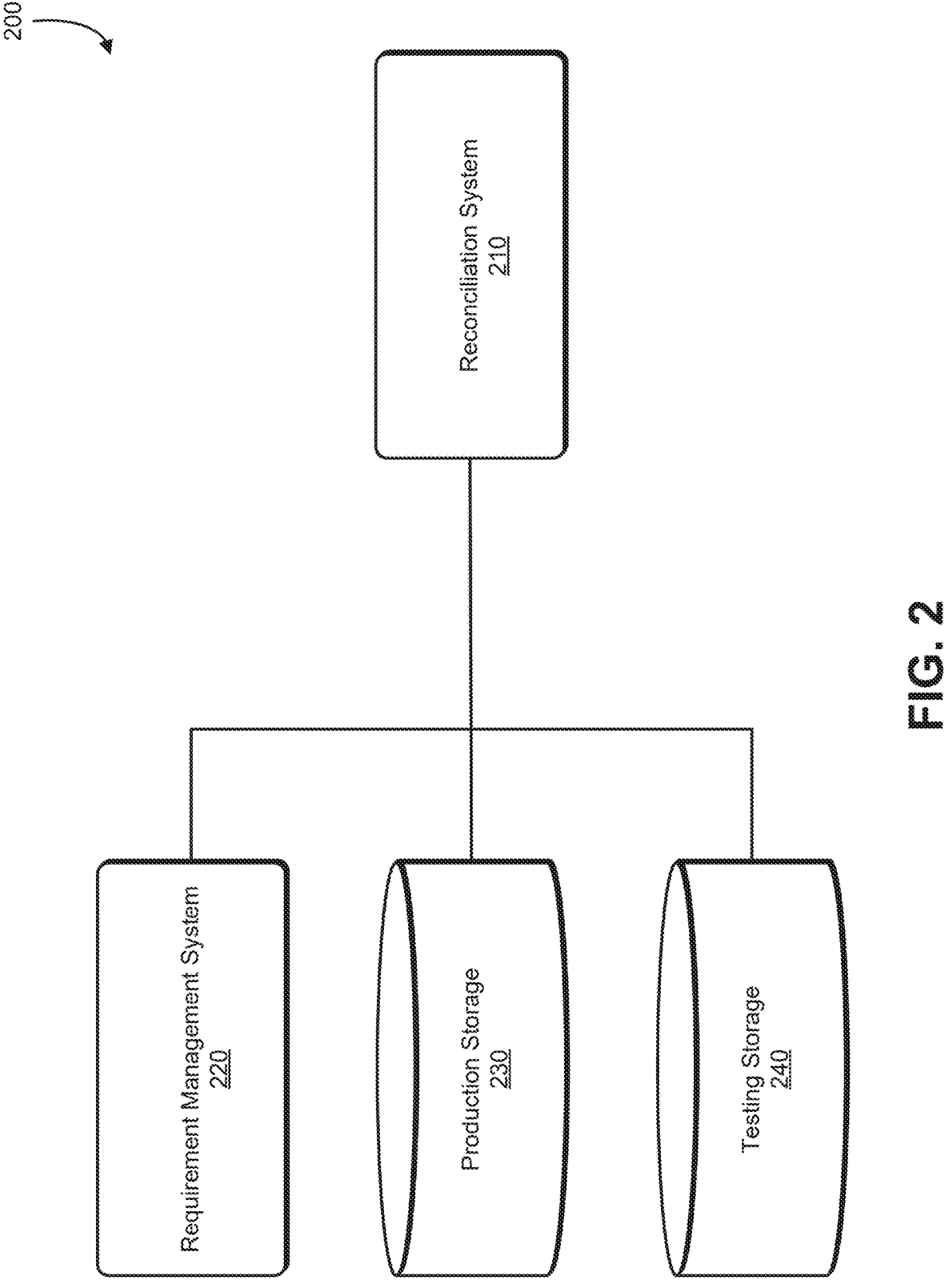
FIG. 2 illustrates an example of a system to control features in accordance with at least one embodiment.

FIG. 2 illustrates an aspect of environment 200 for reconciliation system 210, requirement management system 220, production storage 230, and testing storage 240, in which at least one embodiment may be practiced. In one example, environment 200 is part of backend system 110 illustrated in FIG. 1.

In at least one embodiment, reconciliation system 210 may refer to any combination of software logic, hardware logic, and circuitry for reconciliation of features and their requirements. In some examples, reconciliation system 210 can be part of reconciliation system 124 illustrated in FIG. 1. Reconciliation system 210 may refer to configurable feature flag hub.

In some examples, reconciliation system 210 may perform monitoring of status indicators associated with one or more requirements of one or more software features. As part of monitoring, reconciliation system 210 may periodically or aperiodically receive status indicators that are stored in requirement management system 220, production storage 230, and testing storage 240. In one example, reconciliation system 210 may receive a batch of service indicators periodically (e.g., every 1 hour, every 24 hours, etc.).

Reconciliation system 210 may perform different types of monitoring. One example monitoring may include determining whether there is a mismatch between status indicators that are stored in requirement management system 220, production storage 230, and/or testing storage 240. Examples of mismatch are further described in conjunction with FIG. 5. Reconciliation system 210 may generate or update dashboards to insert status indicators received from requirement management system 220, production storage 230, and testing storage 240. One or more entities may easily identify the mismatch between the status indicators. Also, if there is a discrepancy between current and previous values, reconciliation system 210 may perform a mitigation of risk described further herein.

Another example monitoring can include comparing status indicators that are recently received from requirement management system 220, production storage 230, and/or testing storage 240 and previous status indicators within the dashboard. If there is a discrepancy between current and previous values, reconciliation system 210 may perform the mitigation of risk. Other examples of monitoring may include determining whether the one or more features are disabled (e.g., put in dark mode) and further determining whether the one or more features are deployed but not exposed to user devices.

In at least one embodiment, reconciliation system 210 may send notifications and/or alerts to one or more entities associated with the one or more features. The one or more entities may include an entity that defined the one or more requirements using the requirement management system 220. The notifications may include push notifications, email notifications, SMS notifications, In-app notifications, desktop notifications, voice notifications, chatbot notifications, etc.

In at least one embodiment, requirement management system 220 may refer to any combination of software logic, hardware logic, and circuitry for requirement management. In some examples, requirement management system 220 can be part of requirement management system 122 illustrated in FIG. 1. Requirement management system 220 may receive requests to generate or update status indicators based on business needs. The updated status indicators may indicate differences between the business needs and what is actually tested or deployed to production.

In at least one embodiment, production storage 230 may refer to a storage that manages status indicators for software features that are deployed. Production storage 230 may include at least a portion of storage 150 illustrated in FIG. 1. Production storage 230 may store status indicators updated as a result of deploying the features to production, which involves one or more controllers of the features to impose requirements defined by requirement management system 220. Production storage 230 may store indicators related to entitlements (e.g., configurations related to platforms such as iOS and Android), microservices, custom requirements from separate database defined by other entities. In some examples, microservices may include their own requirements separate from the one or more features. Production storage 230 may periodically transmit status indicators of the one or more features to reconciliation system 210.

In at least one embodiment, testing storage 240 may refer to a storage that manages status indicators for software features that are deployed. Testing storage 240 may include at least a portion of storage 150 illustrated in FIG. 1. Testing storage 240 may store status indicators updated as a result of testing the features which involves beta users. Testing storage 240 may store indicators related to entitlements (e.g., configurations related to platforms such as iOS and Android), microservices, and custom requirements from separate database defined by other entities. Testing storage 240 may periodically transmit status indicators of the one or more features to reconciliation system 210.

FIG. 3 illustrates an example requirement management interface 300 in accordance with at least one embodiment. Systems that manages requirements for each feature of software packages can provide requirement management interface 300 for various entities (e.g., development teams, engineering team, production team, etc.) that can be involved in the software development life cycle.

In at least one embodiment, one or more entities involved in software development life cycle may use requirement management interface 300 provided by systems such as requirement management system 122 illustrated in FIG. 1 or requirement management system 220 illustrated in FIG. 2. The one or more entities may indicate, via requirement management interface 300, that a feature within a software package includes a requirement (e.g., configurable code). The one or more entities may indicate that the status of the requirement is enabled, meaning that the feature can be visible to user 102 while it is deployed.

The one or more entities may add comments specifying the proportions of how the feature is distributed among different user bases. For example, they may define that 40% of users experiencing the feature have a bank card, another 40% have a bank account, and 50% are credit card customers. This filtering can be achieved by determining the identifiers of users since each customer is assigned a unique customer identifier. The one or more entities may specify (e.g., whitelist) that users with certain user account identifiers can be allowed to experience the feature. The comments may trigger the feature to be displayed only if the customer meets the specified criteria. The comments may become metadata of the requirements or features.

The one or more entities may determine that the feature is, for example, for use with a specific online payment network (e.g., Zelle, Venmo, etc.). The one or more entities may further determine that the storage location for the requirement is 'entitlement service' and the platform on which the feature is deployed is for Android. The one or more entities may determine other platforms (e.g., iOS, Android, online service) instead.

As a result of determining one or more requirements for a software feature via interfaces such as the requirement management interface 300, these requirements can be monitored and/or tested throughout the development cycle. For example, testing is performed to beta users to ensure that the proportions can be met. This ensures that the software feature is not unintentionally released before it is ready to be visible to the customer.

Figure 4:
FIG. 4 illustrates an example dashboard that indicates match between status indicators in accordance with at least one embodiment.

FIG. 4 illustrates an example dashboard 400 that indicates match between status indicators in accordance with at least one embodiment. Systems that manage a set of status indicators for each feature of software packages received from different storage locations can generate, modify, and delete dashboard 400. The systems may include, for example, management system 120 and reconciliation system 124 illustrated in FIG. 1 and reconciliation system 210 illustrated in FIG. 2.

In at least one embodiment, dashboard 400 may display different status indicators associated with each feature. For example, "banking services" feature may include indicators such as, for example, 'channel-mobile,' "channel-iOS," "testing status-enabled," and "production status-enabled." "Lockcard" feature may include indicators such as "channel-online," "platform-browser," "testing status-enabled," and "production status-enabled." "Paperless" feature may include indicators such as, "channel-mobile," "platform-android," "testing status-enabled," and "production status-enabled." "Travel notice" feature may include indicators such as "channel-mobile," "platform-iOS," "testing status-enabled," and "production status-enabled." Those status indicators can be defined as a result of imposing requirements using at least requirement management system 122 illustrated in FIG. 1. The status indicators can be periodically or aperiodically updated as a result of reconciliation system 124 illustrated in FIG. 1 or reconciliation system 210 illustrated in FIG. 2 receiving updates from different storage locations (e.g., production storage 230, testing storage 240, storage locations that correspond to requirement management system 220). The status indicators can be linked to identifiers or any other metadata that can cause additional information of the status indicators to be provided.

In some examples, dashboard 400 indicates that all the status indicators for all features match Specifically, the status indicators "testing status-enabled" and "production status-enabled" matches, which may result in the indicator "confidence level-high," "Enabled" may indicate that the feature can be visible to user 102. In the other hand, "disabled" may indicate that the feature cannot be visible to user 102 even after deployment. The indicators may suggest releasing all the features (e.g., "banking services," "lockcard," "paperless," "travel notice,") to production automatically or in response to a request from one or more entities (e.g., production team). The matching status indicators of dashboard 400 can indicate that the one or more entities have performed their due diligence, and no notifications or alerts need to be sent to the one or more entities via, for example, reconciliation system 124 illustrated in FIG. 1 or reconciliation system 220 illustrated in FIG. 2.

Figure 5:
FIG. 5 illustrates another example dashboard that indicates mismatch between status indicators in accordance with at least one embodiment.

FIG. 5 illustrates another example dashboard 500 that indicates mismatch between status indicators in accordance with at least one embodiment. Systems that manage a set of status indicators for each feature of software packages received from different storage locations can manage (e.g., generate, modify, delete) dashboard 500. The systems may include, for example, management system 120 and reconciliation system 124 illustrated in FIG. 1 and reconciliation system 210 illustrated in FIG. 2.

In at least one embodiment, dashboard 500 may display different status indicators associated with each feature. For example, "banking services" feature may include indicators such as, for example, "channel-mobile," "channel-iOS," "testing status-disabled," and "production status-enabled." "Lockcard" feature may include indicators such as "channel-online," "platform-browser," "testing status-enabled," and "production status-disabled." "Paperless" feature may include indicators such as "channel-mobile," "platform-android," "testing status-N/A," and "production status-enabled." "Travel notice" feature may include indicators such as "channel-mobile," "platform-iOS," "testing status-disabled," and "production status-N/A." Those status indicators can be defined as a result of imposing requirements using requirement management system 122 illustrated in FIG. 1. The status indicators can be periodically or aperiodically updated as a result of reconciliation system 124 illustrated in FIG. 1 and reconciliation system 210 illustrated in FIG. 2 receiving updates from different storage locations (e.g., production storage 230, testing storage 240, storage locations that correspond to requirement management system 220). The status indicators can be linked to identifiers or any other metadata that can cause additional information of the status indicators to be provided.

In some examples, dashboard 500 indicates that there is a mismatch of status indicators for all features. Specifically, in dashboard 500, status indicators "testing status-disabled," and "production status-enabled" mismatches, which may result in the indicator "confidence level-medium," for feature "banking services." Also, in dashboard 500, status indicators "testing status-enabled" and "production status-disabled" mismatches, which may result in the indicator "confidence level-low," for feature "lockcard." In dashboard 500, status indicators "testing status-N/A," and "production status-enabled" mismatches, which may result in the indicator "confidence level-low," for feature "paperless." In dashboard 500, status indicators "testing status-disabled," and "production status-N/A" mismatches, which may result in the indicator "confidence level-low," for feature "travel notice." The indicators may suggest not releasing all the features (e.g., 'banking services,' 'lockcard,' 'paperless,' 'travel notice,') to production. Instead, systems (e.g., reconciliation systems described in conjunction with at least FIGS. 1-2) can notify different systems or entities of a potential defect such that those systems or entities can perform one or more corrective actions. Additionally, the systems may generate a high severity defect indicator if there is a mismatch between 'testing status' and 'production status.' By using dashboard 500, entities may identify potential gaps before deploying release changes and may take action to avoid issues arising out from those mismatches.

In some examples, mismatches can be indicated by status indicator 'confidence level.' Color coding can be applied to those indicators to flag those issues. For example, for 'medium' and 'low' confidence levels, colors such as red, orange, or yellow can be applied. For 'high' confidence levels, colors such as blue or green can be applied.

Figure 6:
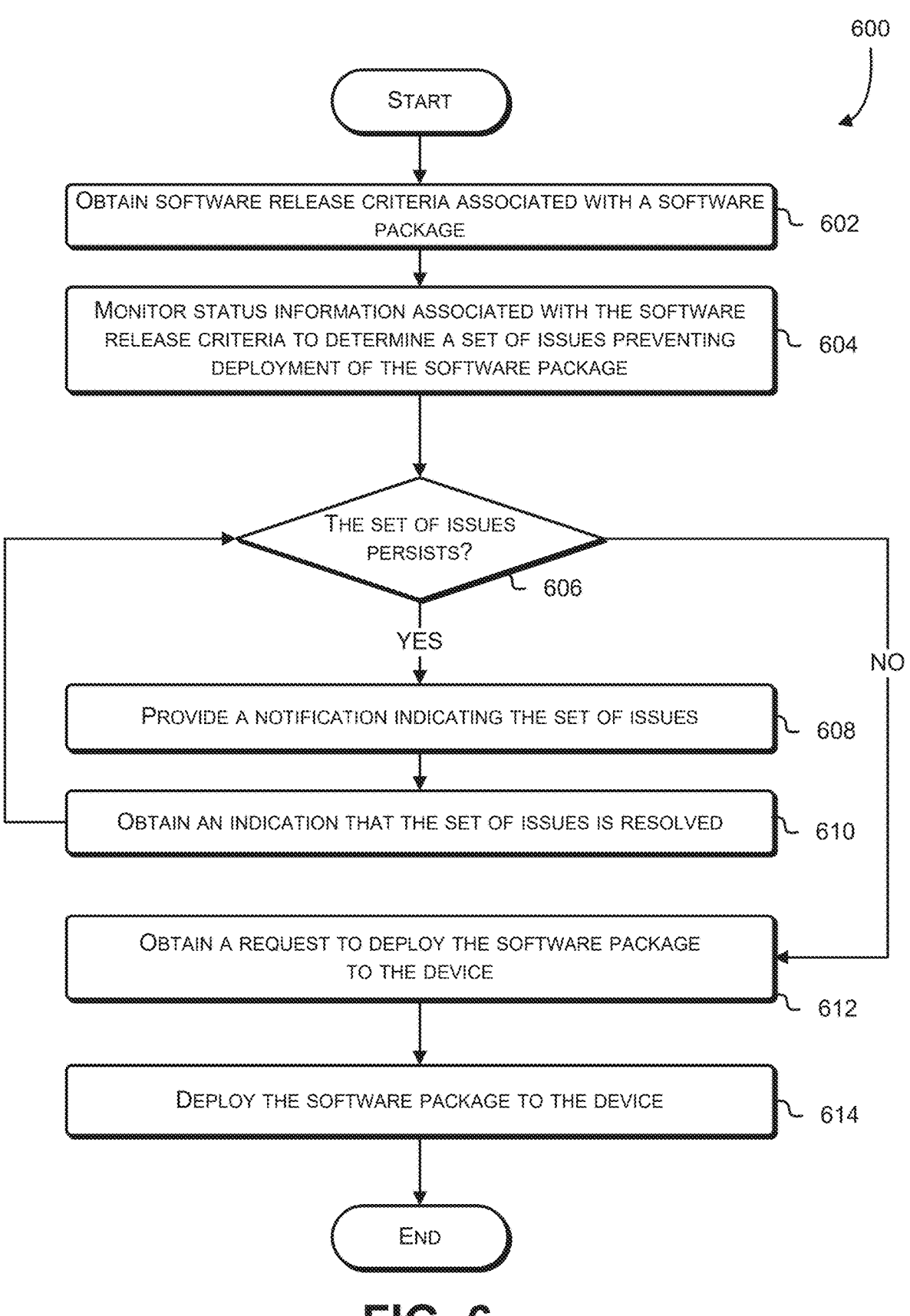
FIG. 6 illustrates a flowchart that illustrates an example of managing requirements to deploy software packages in accordance with at least one embodiment.

FIG. 6 is a flowchart illustrating an example of a process 600 for managing requirements to deploy software packages in accordance with at least one embodiment. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, backend system 110, management system 120, software deployment system 130, software testing system 140 illustrated in FIG. 1, reconciliation system 210, requirement management system 220, production storage 230, testing storage 240 illustrated in FIG. 2, computing device 1100 illustrated in FIG. 11, and one or more of hardware and software described in conjunction with FIG. 1. The process 600 may include a series of operations wherein software release criteria is obtained, status information is monitored, notification is provided, request to deploy software package is obtained, and the software package is deployed.

At block 602, process 600 may further include obtaining software release criteria associated with a software package. Software release criteria may include requirements described herein.

At block 604, process 600 may further include monitoring status information associated with the software release criteria to determine a set of issues preventing deployment of the software package. Status information may include status indicators stored in one or more dashboards described herein. The set of issues may include mismatch of status indicators described herein. Monitoring can be either periodic or aperiodic.

At block 606, process 600 may further include proceeding to block 608 if the set of issues persists. If not, process 600 may proceed to block 608. At block 608, process 600 may further include providing a notification indicating the set of issues. The notification can be provided to appropriate entities based on the type of features or status indicators.

At block 610, process 600 may further include obtaining an indication that the set of issues is resolved. The indication can be obtained by the same entity that the notification was sent to. At block 612, process 600 may further include obtaining a request to deploy the software package to the device.

At block 614, process 600 may further include deploying the software package to the device. The deploying can be based on analyzing a testing status of the software package from the status information at the storage location and as a result of receiving the testing status confirming that the condition has been met. Analyzing may include querying status information from one or more versions of dashboard (e.g., dashboard 400 illustrated in FIG. 4, dashboard 500 illustrated in FIG. 5). Note that one or more of the operations performed in blocks 602-614 may be performed in various orders and combinations, including in parallel.

Figure 7:
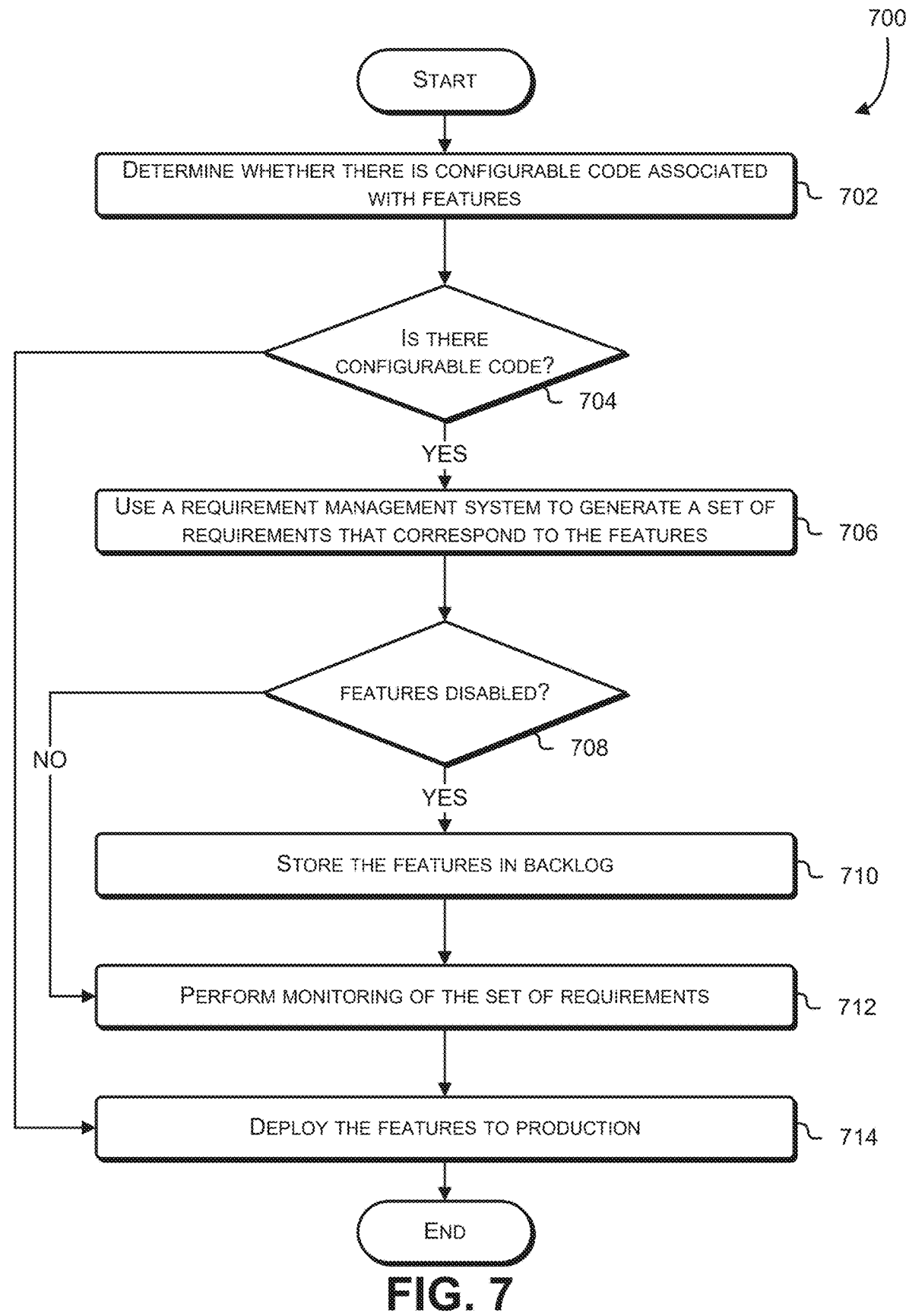
FIG. 7 illustrates a flowchart that illustrates another example of managing requirements to deploy software packages in accordance with at least one embodiment.

FIG. 7 is a flowchart illustrating an example of another process 700 for managing requirements to deploy software packages in accordance with at least one embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as backend system 110, management system 120, software deployment system 130, software testing system 140 illustrated in FIG. 1, reconciliation system 210, requirement management system 220, production storage 230, testing storage 240 illustrated in FIG. 2, computing device 1100 illustrated in FIG. 11, and one or more of hardware and software described in conjunction with FIG. 1. The process 700 may include a series of operations wherein configurable code is determined, a set of requirements is generated, the set of requirements is monitored, and the features are deployed.

At block 702, process 700 may further include determining whether there is configurable code associated with features (e.g., software features). Systems such as a requirement management system (e.g., requirement management system 122 illustrated in FIG. 1 and requirement management system 220 illustrated in FIG. 2) can provide interface to receive one or more inputs from one or more entities that are involved with software development lifecycle of one or more features that include configurable code. At block 704, process 700 may further include proceeding to block 706 if configurable code exists. If not, process 700 may proceed to block 714.

At block 706, process 700 may further include using the requirement management system to generate a set of requirements that correspond to the features. The set of requirements can be software release criteria. The requirement management system may receive details regarding the set of requirements where the details are further described in conjunction with FIGS. 1-3. At block 708, process 700 may further include proceeding to block 710 if the features are disabled. If not, process 700 may proceed to block 712.

At block 710, process 700 may further include storing the features in backlog. Backlog may correspond with different development teams for various platforms (e.g., iOS, Android, online service).

At block 712, process 700 may further include performing monitoring of the set of requirements. Monitoring may include analyzing whether there is a discrepancy between status indicators received from testing, production, and requirement management system. Monitoring may include analyzing whether there is a discrepancy between the most current status indicators and previous status indicators that are stored in a dashboard (e.g., dashboard 400 illustrated in FIG. 4, dashboard 500 illustrated in FIG. 5 illustrated in FIG. 5). In at least one embodiment, block 712 may include one or more blocks of process 800 illustrated in FIG. 8.

At block 714, process 700 may further include deploying the features to production. In some examples, deploying the features to production could include executing business as usual (BAU) of one or more entities that are involved with software development life cycle of the features to release the features to the user device. Note that one or more of the operations performed in blocks 702-714 may be performed in various orders and combinations, including in parallel.

Figure 8:
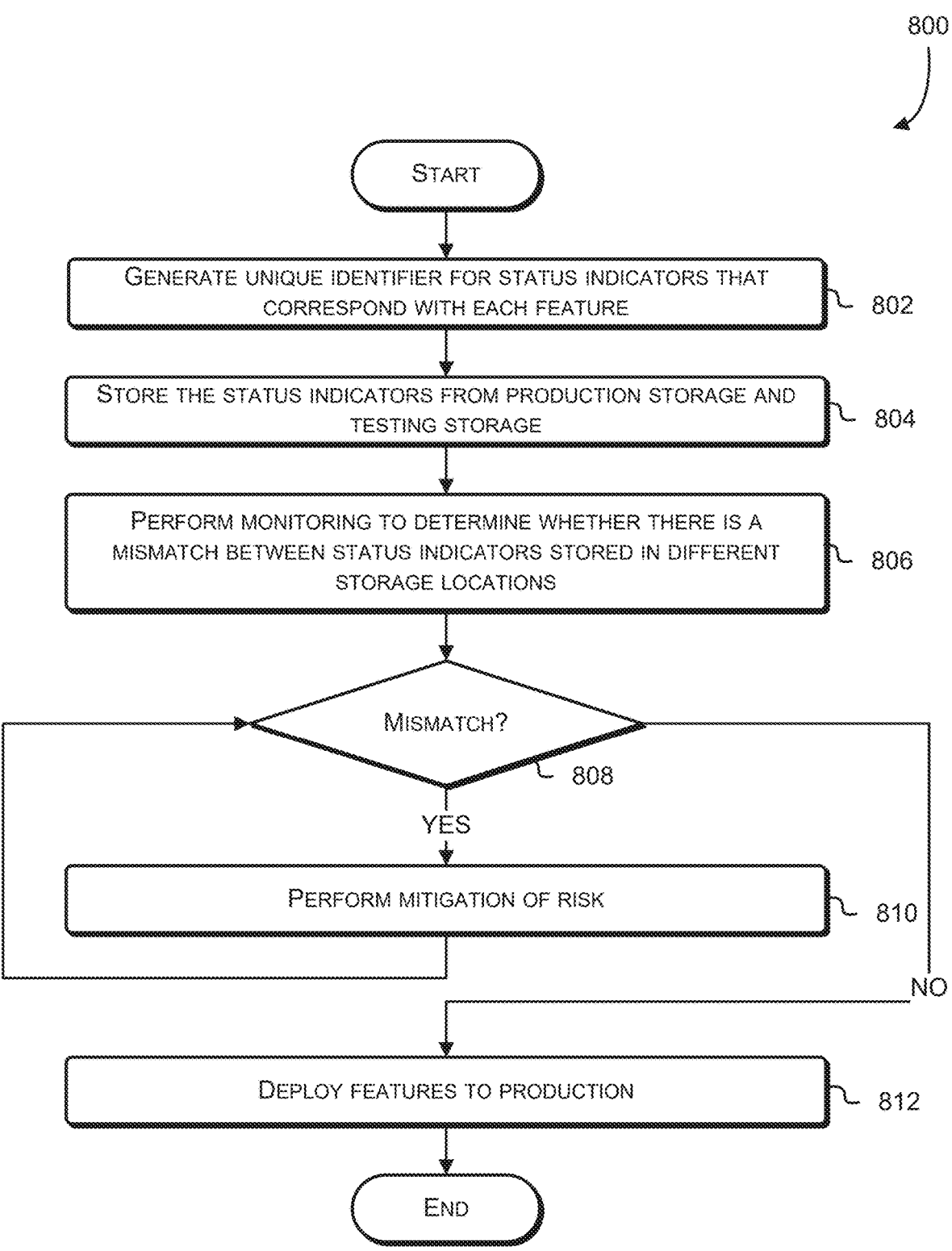
FIG. 8 illustrates a flowchart that illustrates an example of monitoring requirements to deploy software packages in accordance with at least one embodiment.

FIG. 8 is a flowchart illustrating an example of a process 800 for monitoring requirements to deploy software packages in accordance with at least one embodiment. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as backend system 110, management system 120, software deployment system 130, software testing system 140 illustrated in FIG. 1, reconciliation system 210, requirement management system 220, production storage 230, testing storage 240 illustrated in FIG. 2, computing device 1100 illustrated in FIG. 11, and one or more of hardware and software described in conjunction with FIG. 1. The process 800 may include a series of operations wherein unique identifiers for status indicators are generated, mismatch between status indicators stored in different repositories is monitored, mitigation of risk is performed, and features are deployed to production.

At block 802, process 800 may further include generating unique identifiers for status indicators that correspond with each feature. At block 804, process 800 may further include storing the status indicators from production storage, testing storage, and requirement management systems such as Jira.

At block 806, process 800 may further include performing monitoring to determine whether there is a mismatch between status indicators stored in different storage locations. The monitoring may further include whether there is mismatch between current status indicators and previous status indicators. At block 808, process 800 may further include proceeding to block 810 if mismatch exists. If not, process 800 may proceed to block 812.

At block 810, process 800 may further include performing mitigation of risk. In some examples, mitigation of risk may include generating or updating dashboards that include status identifiers, notifying relevant entities, and generating or updating audit page. In at least one embodiment, block 810 may include one or more blocks of process 900 illustrated in FIG. 9.

At block 812, process 800 may further include deploying features to production. Note that one or more of the operations performed in blocks 802-812 may be performed in various orders and combinations, including in parallel.

Figure 9:
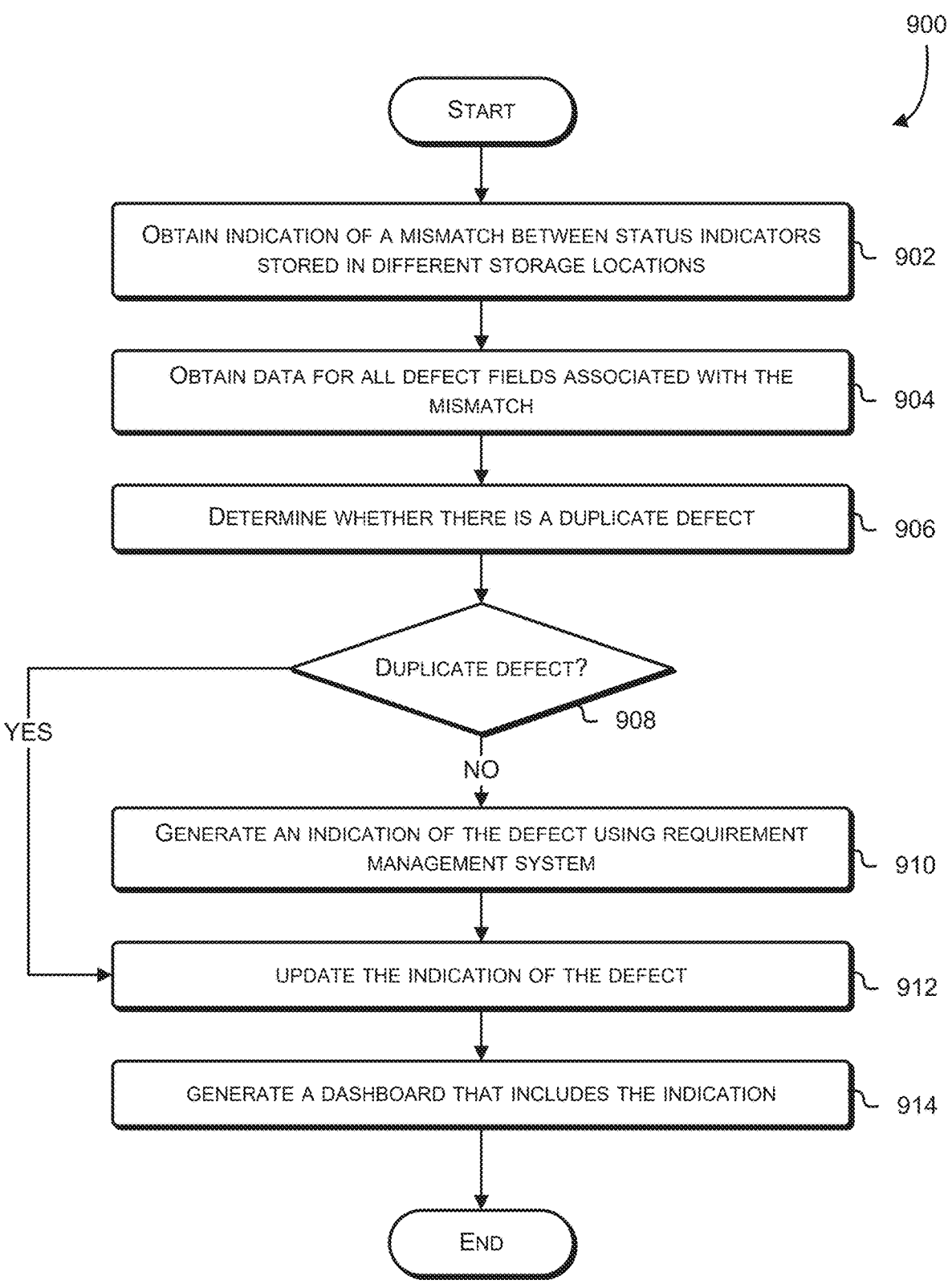
FIG. 9 illustrates a flowchart that illustrates an example of generating dashboards to monitor requirements in accordance with at least one embodiment.

FIG. 9 is a flowchart illustrating an example of a process 900 for generating dashboards to monitor requirements in accordance with at least one embodiment. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system, such as backend system 110, management system 120, software deployment system 130, software testing system 140 illustrated in FIG. 1, reconciliation system 210, requirement management system 220, production storage 230, testing storage 240 illustrated in FIG. 2, computing device 1100 illustrated in FIG. 11, and one or more of hardware and software described in conjunction with FIG. 1. The process 900 may include a series of operations wherein an indication of a mismatch between status indicators is obtained, indication of the defect is generated, and a dashboard that includes the indication is generated.

At block 902, process 900 may further include obtaining indication of a mismatch between status indicators stored in different storage locations. Process 900 may also include obtaining indication of a mismatch between current status indicators and previous status indicators stored in a dashboard (e.g., dashboard 400 illustrated in FIG. 4, dashboard 500 illustrated in FIG. 5).

At block 904, process 900 may further include obtaining data for all defect fields associated with the mismatch. This may include transmitting requests to entities associated with microservices that are part of the features associated with the status indicators.

At block 906, process 900 may further include determining whether there is a duplicate defect. At block 908, process 900 may further include proceeding to block 912 if a duplicate defect exists. If not, process 800 may proceed to block 910.

At block 910, process 900 may further include generating an indication of the defect using requirement management system. This may further include generating a label (e.g., cfc-auto) in Jira. At block 912, process 900 may further include updating the indication of the defect. Updating the indication may include updating defect identifier against user stories that are associated with the mismatch.

At block 914, process 900 may further include generating a dashboard that includes the indication of the defect. The dashboard may include dashboard 400 illustrated in FIG. 4, dashboard 500 illustrated in FIG. 5. The dashboard may include the mismatch of one or more status indicators associated with one or more features or user stories and match of one or more status indicators associated with the one or more features or user stories. Note that one or more of the operations performed in blocks 902-914 may be performed in various orders and combinations, including in parallel.

Note that in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 10 is a block diagram illustrating driver and/or runtime software comprising one or more libraries to provide one or more application programming interfaces (APIs), in accordance with at least one embodiment. The one or more APIs may be provided to a backend system 110 illustrated in FIG. 1 and implemented at a computing device, such as the computing device 1100 illustrated in FIG. 11. A software program 1002 can be a software module. A software program 1002 may comprise one or more software modules. One or more APIs 1010 can be sets of software instructions that, if executed, cause one or more processors (e.g., hardware described in conjunction with FIG. 1) to perform one or more computational operations. One or more APIs 1010 can be distributed or otherwise provided as a part of one or more libraries 1006, runtimes 1004, drivers 1004, and/or any other grouping of software and/or executable code further described herein. One or more APIs 1010 may perform one or more computational operations in response to invocation by software programs 1002. A software program 1002 can be a collection of software code, commands, instructions, or other sequences of text to instruct a computing device to perform one or more computational operations and/or invoke one or more other sets of instructions, such as APIs 1010 or API functions 1012, to be executed. In some examples, functionality provided by one or more APIs 1010 may include software functions 1012.

In at least one embodiment, one or more APIs 1010 are hardware interfaces to one or more circuits to perform one or more computational operations. One or more APIs 1010 described herein are implemented as one or more circuits to perform one or more techniques described above in conjunction with FIGS. 1-9. Additionally, one or more software programs 1002 comprise instructions that, if executed, cause one or more hardware devices and/or circuits to perform one or more techniques described above in conjunction with FIGS. 1-9. The dashboard may include dashboard 400 illustrated in FIG. 4, dashboard 500 illustrated in FIG. 5). The dashboard may include information of status indicators received in a batch from different storage locations.

In at least one embodiment, software programs 1002, such as user-implemented software programs, may utilize one or more APIs 1010 to perform various computing operations, such as memory reservation, matrix multiplication, arithmetic operations, or any computing operation performed by any hardware described in conjunction with FIG. 1. One or more APIs 1010 can provide a set of callable functions 1012, referred to herein as APIs, API functions, and/or functions, that individually perform one or more computing operations. For example, one or more APIs 1010 provide functions 1012 to perform feature and requirement management 1016. In some examples, feature and requirement management 1016 includes performing one or more blocks of process 600 illustrated in FIG. 6, process 700 illustrated in FIG. 7, process 800 illustrated in FIG. 8, and process 900 illustrated in FIG. 9.

In at least one embodiment, an interface can be software instructions that, if executed, provide access to one or more functions 1012 provided by one or more APIs 1010. A software program 1002 may use a local interface when a software developer compiles the one or more software programs 1002 in conjunction with one or more libraries 1006 comprising or otherwise providing access to one or more APIs 1010. One or more software programs 1002 can be compiled statically in conjunction with pre-compiled libraries 1006 or uncompiled source code comprising instructions to perform one or more APIs 1010. One or more software programs 1002 can be compiled dynamically and the one or more software programs 1002 can utilize a linker to link to one or more pre-compiled libraries 1006 comprising one or more APIs 1010.

In at least one embodiment, a software program 1002 may use a remote interface when a software developer executes a software program that utilizes or otherwise communicates with a library 1006 comprising one or more APIs 1010 over a network or other remote communication medium. One or more libraries 1006 comprising one or more APIs 1010 can be performed by a remote computing service, such as a computing resource service provider. In another embodiment, one or more libraries 1006 comprising one or more APIs 1010 can be performed by any other computing host providing the one or more APIs 1010 to one or more software programs 1002.

In at least one embodiment, a processor performing or using one or more software programs 1002 may call, use, perform, or otherwise implement one or more APIs 1010 to allocate and otherwise manage memory 1014 to be used by the software programs 1002. Those software programs 1002 may request a resource management system 1016 receive and API call to obtain an access token, identify permissions, and generate the access token using functions 1012 provided, in an embodiment, by one or more APIs 1010.

In at least one embodiment, an API 1010 can be provided by driver and/or runtime software 1004. Driver and/or runtime software 1004 may refer to data values and software instructions that, if executed, perform or otherwise facilitate operation of one or more functions 1012 of one or more APIs 1010 during load and execution of one or more portions of a software program 1002. Runtime software 1004 may refer to data values and software instructions that, if executed, perform, or otherwise facilitate operation of one or more functions 1012 of one or more APIs 1010 during execution of software program 1002.

In at least one embodiment, one or more APIs 1010 may provide combined arithmetic operations through driver and/or runtime software 1004, as described above. One or more software programs 1002 may utilize one or more APIs 1010 provided by driver and/or runtime software 1004 to allocate or otherwise reserve blocks of memory. One or more APIs 1010 can perform operations performed by different systems (e.g., management system 120, reconciliation system 124, requirement management system 122, software deployment system 130, software testing system 140 illustrated in FIG. 1, reconciliation system 210, requirement management system 220 illustrated in FIG. 2). In at least one embodiment, an exemplary block diagram 1000 depicts one or more processors comprising one or more circuits to perform one or more software programs 1002 to combine two or more APIs 1010 into a single API.

In at least one embodiment, memory 1014 may refer to one or more devices to store data. Memory 1014 may include one or more random access memory (RAM), read-only memory (ROM), flash memory (e.g., USB flash drives, SSD, memory cards), cache memory, hard disk drives (HDDs), virtual memory, graphics memory, optical discs, network attached storage (NAS), cloud storage, tape storage, etc.

Figure 11:
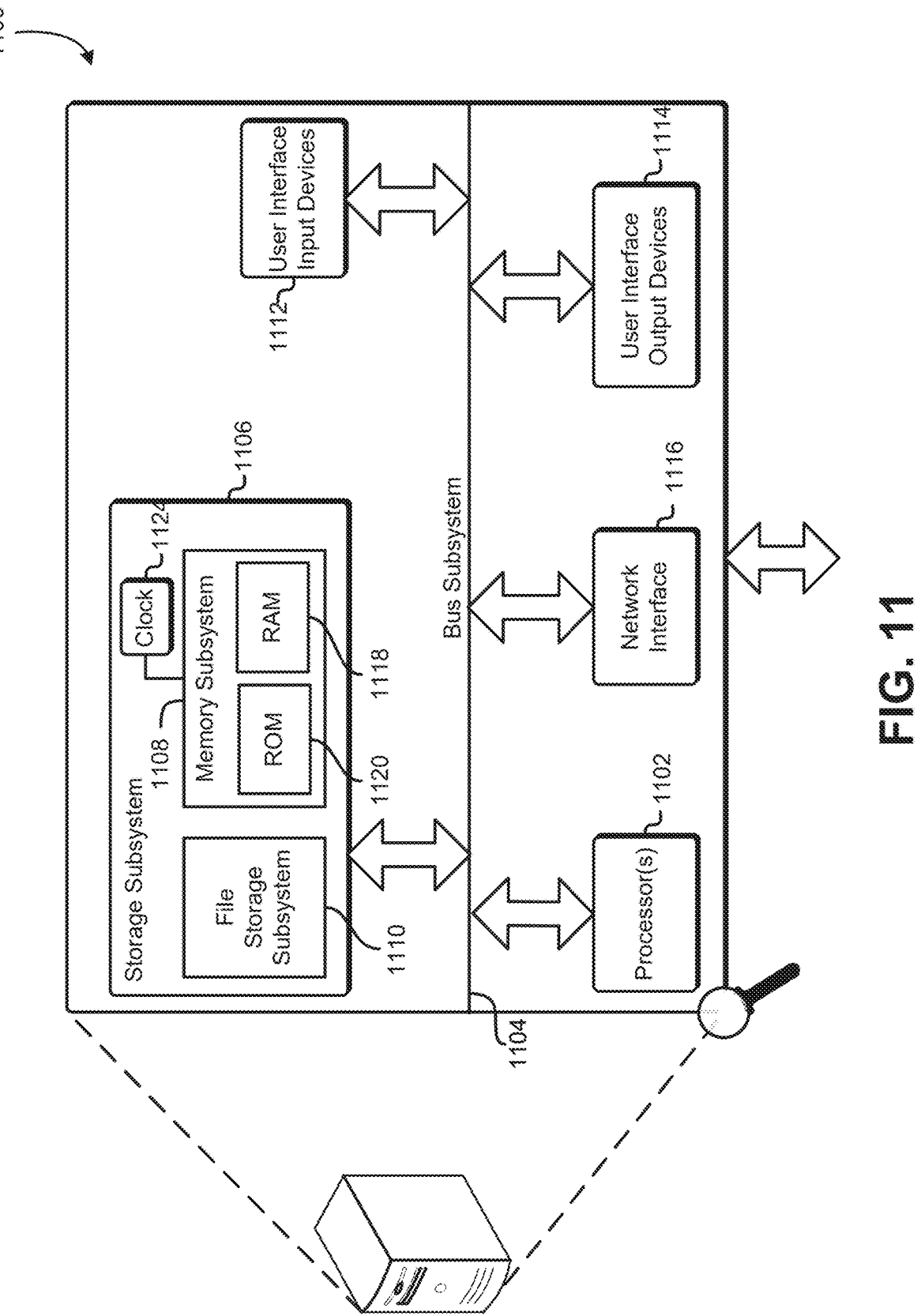
FIG. 11 illustrates a computing device that may be used in accordance with at least one embodiment/an environment in which various embodiments can be implemented.

FIG. 11 is an illustrative, simplified block diagram of a computing device 1100 that can be used to practice at least one embodiment of the present disclosure. In various embodiments, the computing device 1100 includes any appropriate device operable to send and/or receive requests, messages, or information over an appropriate network and convey information back to a user of the device. The computing device 1100 may be used to implement any of the systems illustrated and described above. For example, the computing device 1100 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 1100 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 11, the computing device 1100 may include one or more processors 1102 that, in embodiments, communicate with and are operatively coupled to a number of peripheral subsystems via a bus subsystem. In some embodiments, these peripheral subsystems include a storage subsystem 1106, comprising a memory subsystem 1108 and a file/disk storage subsystem 1110, one or more user interface input devices 1112, one or more user interface output devices 1114, and a network interface subsystem 1116. Such storage subsystem 1106 may be used for temporary or long-term storage of information.

In some embodiments, the bus subsystem 1104 may provide a mechanism for enabling the various components and subsystems of computing device 1100 to communicate with each other as intended. Although the bus subsystem 1104 is shown schematically as a single bus, alternative embodiments of the bus subsystem utilize multiple buses. The network interface subsystem 1116 may provide an interface to other computing devices and networks. The network interface subsystem 1116 may serve as an interface for receiving data from and transmitting data to other systems from the computing device 1100. In some embodiments, the bus subsystem 1104 is utilized for communicating data such as details, search terms, and so on. In an embodiment, the network interface subsystem 1116 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 1116 is enabled by wired and/or wireless connections and combinations thereof.

In some embodiments, the user interface input devices 1112 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1100. In some embodiments, the one or more user interface output devices 1114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1100. The one or more user interface output devices 1114 can be used, for example, to present user interfaces to facilitate user interaction with applications performing processes described and variations therein, when such interaction may be appropriate.

In some embodiments, the storage subsystem 1106 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1106. These application modules or instructions can be executed by the one or more processors 1102. In various embodiments, the storage subsystem 1106 additionally provides a repository for storing data used in accordance with the present disclosure. In some embodiments, the storage subsystem 1106 comprises a memory subsystem 1108 and a file/disk storage subsystem 1110.

In embodiments, the memory subsystem 1108 includes a number of memories, such as a main random-access memory (RAM) 1118 for storage of instructions and data during program execution and/or a read only memory (ROM) 1120, in which fixed instructions can be stored. In some embodiments, the file/disk storage subsystem 1110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1100 includes at least one local clock 1124. The at least one local clock 1124, in some embodiments, is a counter that represents the number of ticks that have transpired from a particular starting date and, in some embodiments, is located integrally within the computing device 1100. In various embodiments, the at least one local clock 1124 is used to synchronize data transfers in the processors for the computing device 1100 and the subsystems included therein at specific clock pulses and can be used to coordinate synchronous operations between the computing device 1100 and other systems in a data center. In another embodiment, the local clock is a programmable interval timer.

The computing device 1100 could be of any of a variety of types, including a portable computer device, tablet computer, a workstation, or any other device described below. Additionally, the computing device 1100 can include another device that, in some embodiments, can be connected to the computing device 1100 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1100 for processing. Due to the ever-changing nature of computers and networks, the description of the computing device 1100 depicted in FIG. 10 is intended only as a specific example for purposes of illustrating the preferred embodiment of the device. Many other configurations having more or fewer components than the system depicted in FIG. 11 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 1100 may include any appropriate hardware, software, and firmware for integrating with a data store as needed to execute aspects of one or more applications for the computing device 1100 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 1100 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 1100 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 1100 may provide the content in one or more forms including, but not limited to, forms that are perceptible to the user audibly, visually, and/or through other senses. The handling of requests and responses, as well as the delivery of content, in an embodiment, is handled by the computing device 1100 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 1100 typically will include an operating system that provides executable program instructions for the general administration and operation of the computing device 1100 and includes a computer-readable storage medium (e.g., a hard disk, random access memory (RAM), read only memory (ROM), etc.) storing instructions that if executed (e.g., as a result of being executed) by a processor of the computing device 1100 cause or otherwise allow the computing device 1100 to perform its intended functions (e.g., the functions are performed as a result of one or more processors of the computing device 1100 executing instructions stored on a computer-readable storage medium).

In an embodiment, the computing device 1100 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 1100 is also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python, or TCL, as well as combinations thereof. In an embodiment, the computing device 1100 is capable of storing, retrieving, and accessing structured or unstructured data. In an embodiment, computing device 1100 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

1. A system, comprising:
   one or more processors; and
   memory including computer-executable instructions that, as a result of execution by the one or more processors, cause the system to at least:
   obtain a set of software release criteria including:
   a condition that a software test be successfully performed prior to deploying a software package to a user device; and
   location information indicating a storage location for status information of the software test; and
   in response to a request to deploy the software package to the user device:
   analyze a testing status of the software package from the status information at the storage location; and
   as a result of the testing status confirming that the condition has been met, deploy the software package to the user device.

2. The system of clause 1, wherein the computer-executable instructions further include executable instructions that further cause the system to:
   identify a set of issues associated with the set of software release criteria by at least monitoring a set of status information of the software package, the set of issues preventing the software package to be deployed to the user device; and
   provide a notification indicating the set of issues.

3. The system of clause 1 or 2, wherein the computer-executable instructions further include executable instructions that further cause the system to:
   in response to providing the notification, obtain an indication that the set of issues were resolved.

4. The system of any of clauses 1-3, wherein the set of issues include a mismatch between the set of status information obtained at different time periods.

5. The system of any of clauses 1-4, wherein the set of software release criteria further specifies an operating system platform to which the software package is to be deployed.

6. A computer-implemented method, comprising:

obtaining a set of software release criteria including:

a condition that a software test be successfully performed prior to deploying a software package to a user device; and location information indicating a storage location for status information of the software test; and in response to a request to deploy the software package to the user device:

analyzing a testing status of the software package from the status information at the storage location; and as a result of the testing status confirming that the condition has been met, deploying the software package to the user device.

7. The computer-implemented method of clause 6, further comprising:

obtaining a set of status information of the software package to identify an issue preventing deployment of the software package based, at least in part, on the set of software release criteria;

providing a notification indicating an action to be performed to resolve the issue; and obtaining an indication that the issue is resolved as a result of performing the action.

8. The computer-implemented method of clause 6 or 7, wherein the status information includes Boolean values or status codes.

9. The computer-implemented method of any of clauses 6-8, wherein the software package includes a set of microservices.

10. The computer-implemented method of any of clauses 6-9, wherein the set of software release criteria is stored in a plurality of storage locations.

11. The computer-implemented method of any of clauses 6-10, further comprising:

determining whether the software package is enabled or disabled; and generating additional software release criteria for the software package based, at least in part, on the determination.

12. The computer-implemented method of any of clauses 6-11, wherein the set of software release criteria further indicates a particular operating system platform or a particular application platform to which the software package is to be deployed.

13. The computer-implemented method of any of clauses 6-12, wherein the testing status indicates that the software package was distributed to a subset of users selected from a set of users based, at least in part, on a set of predetermined criteria.

14. A non-transitory computer-readable storage medium storing computer-executable instructions that, as a result of being executed by one or more processors of a computer system, cause the computer system to at least:

receive a set of software release criteria comprising:

a condition that a software test be successfully performed prior to deploying a software package to a user device; and location information indicating a storage location for status information of the software test; and in response to a request to deploy the software package to the user device:

analyze a testing status of the software package from the status information at the storage location; and deploy the software package to the user device as a result of the testing status indicating that the condition has been met.

15. The non-transitory computer-readable storage medium of clause 14, wherein the computer-executable instructions further include executable instructions that further cause the computer system to monitor information received from a plurality of storage locations associated with the software package to analyze a set of issues preventing deployment of the software package based, at least in part, on the set of software release criteria.

16. The non-transitory computer-readable storage medium of clause 14 or 15, wherein the computer-executable instructions further cause the computer system to:

transmit a notification indicating the set of issues indicating a mismatch between status information stored in different storage locations; and receive an indication that the mismatch is resolved a result of performing a set of actions to the software package.

17. The non-transitory computer-readable storage medium of any of clauses 14-16, wherein the computer-executable instructions further cause the computer system to generate a dashboard that includes a plurality of status indicators corresponding to the set of software release criteria.

18. The non-transitory computer-readable storage medium of any of clauses 14-17, wherein the computer-executable instructions further cause the computer system to receive status information of the software package indicating that the software package is enabled.

19. The non-transitory computer-readable storage medium of any of clauses 14-18, wherein the set of software release criteria further specifies a software platform for the software package.

20. The non-transitory computer-readable storage medium of any of clauses 14-19, wherein the testing status indicates that the software package was distributed to a portion of a plurality of users selected based, at least in part, on a set of preselected criteria.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention, and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:
1. A system, comprising:
   one or more processors; and

memory including computer-executable instructions that, as a result of execution by the one or more processors, cause the system to at least:
   obtain a set of software release criteria associated with a plurality of different software platforms including:
      a condition that a software test be successfully performed prior to deploying a software package that is to be visible to one or more user devices operating at least one of the plurality of different software platforms; and
      location information indicating a storage location for a first status indicator of a plurality of status indicators to be generated by different systems associated with a lifecycle of the software package, the first status indicator corresponding to a result of the software test; and
   in response to receiving a batch of the plurality of status indicators based, at least in part, on the location information:
      generate a dashboard to communicate a mismatch between the first status indicator and a second status indicator of the plurality of status indicators to at least one of the different systems, both the first status indicator and the second status indicator corresponding to a feature flag of the software package, the first status indicator indicating that the condition has been unmet and the second status indicator indicating that one or more features of the software package are deployed to be visible on the one or more user devices.

2. The system of claim 1, wherein the computer-executable instructions further include executable instructions that further cause the system to:
   receive another batch of the plurality of status indicators; and
   generate another dashboard that indicates a match between the first status indicator and the second status indicator.

3. The system of claim 1, wherein the dashboard further communicates at least one of a match or a mismatch between at least some other status indicators of the plurality of status indicators that are each associated with the plurality of different software platforms.

4. The system of claim 1, wherein the dashboard includes a mismatch between a subset of the plurality of status indicators obtained at different time periods.

5. The system of claim 1, wherein the set of software release criteria further includes determining whether the one or more user devices corresponds to an account identifier that is within a list in order for the one or more features of the software package to be visible to the one or more user devices.

6. A computer-implemented method, comprising:
   obtaining a set of software release criteria associated with a plurality of different software platforms including:
      a condition that a software test be successfully performed prior to deploying a software package that is to be visible to one or more user devices operating at least one of the plurality of different software platforms; and
      location information indicating a storage location for a first status indicator of a plurality of status indicators to be generated by different systems associated with a lifecycle of the software package; and
   in response to receiving a batch of the plurality of status indicators based, at least in part, on the location information:

generating a dashboard to communicate a mismatch between the first status indicator and a second status indicator of the plurality of status indicators to at least one of the different systems, both the first status indicator and the second status indicator corresponding to a feature flag of the software package, the first status indicator indicating that the condition has been unmet and the second status indicator indicating that one or more features of the software package are deployed to be visible on the one or more user devices.

7. The computer-implemented method of claim 6, further comprising:

in response to providing the dashboard, receiving another batch of the plurality of status indicators; and generating another dashboard that indicates a match between the first status indicator and the second status indicator.

8. The computer-implemented method of claim 6, wherein a third status indicator of the plurality of status indicators indicate the mismatch.

9. The computer-implemented method of claim 6, wherein the software package includes a set of microservices.

10. The computer-implemented method of claim 6, wherein the mismatch causes one or more operations to be performed by the at least one of the different systems to reconcile the mismatch.

11. The computer-implemented method of claim 6, further comprising:

determining a period of time during which the one or more features were deployed to be visible on the one or more user devices.

12. The computer-implemented method of claim 6, wherein the plurality of different software platforms comprise an online service, at least one operating system, or a combination thereof.

13. The computer-implemented method of claim 6, wherein a third status indicator of the plurality of status indicators indicates that the software package was distributed to a subset of users selected from a set of users based, at least in part, on a set of predetermined criteria.

14. A non-transitory computer-readable storage medium storing computer-executable instructions that, as a result of being executed by one or more processors of a computer system, cause the computer system to at least:

receive a set of software release criteria associated with a plurality of different software platforms comprising:

a condition that a software test be successfully performed prior to deploying a software package that is to be visible to one or more user devices operating at least one of the plurality of different software platforms; and location information indicating a storage for a first status indicator of a plurality of status indicators to be generated by different systems associated with a lifecycle of the software package; and in response to receiving a batch of the plurality of status indicators based, at least in part, on the location information:

communicate a mismatch between the first status indicator and a second status indicator of the plurality of status indicators to at least one of the different systems, both the first status indicator and the second status indicator corresponding to a feature flag of the software package, the first status indicator indicating that the condition has been unmet and the second status indicator indicating that one or more features of the software package are deployed to be visible on the one or more user devices.

15. The non-transitory computer-readable storage medium of claim 14, wherein the computer-executable instructions further include executable instructions that further cause the computer system to receive another batch of the plurality of status indicators in response to providing a dashboard used to indicate the plurality of different software platforms and communicate the mismatch between the first status indicator and the second status indicator.

16. The non-transitory computer-readable storage medium of claim 15, wherein the computer-executable instructions further cause the computer system to generate another dashboard that indicates a match between the first status indicator and the second status indicator.

17. The non-transitory computer-readable storage medium of claim 14, wherein the computer-executable instructions further cause the computer system to determine a period of time during which the one or more features were deployed to be visible on the one or more user devices.

18. The non-transitory computer-readable storage medium of claim 14, wherein the mismatch is communicated using a third status indicator of the plurality of status indicators.

19. The non-transitory computer-readable storage medium of claim 14, wherein the software test determines whether the one or more features are to be visible to a selected group of user devices and the one or more user devices is outside of the selected group.

20. The non-transitory computer-readable storage medium of claim 14, wherein a third status indicator of the plurality of status indicators indicates that the software package was distributed to a portion of a plurality of users selected based, at least in part, on a set of preselected criteria.

* * * * *